US011789994B1

(12) United States Patent
D

(10) Patent No.: US 11,789,994 B1
(45) Date of Patent: Oct. 17, 2023

(54) SYSTEM AND METHOD FOR ENABLING AN INTERACTIVE NAVIGATION OF A HYBRID MEDIA WEBPAGE

(71) Applicant: Lyceum Technologies Inc, Delaware, DE (US)

(72) Inventor: Thiageshwaran D, Chennai (IN)

(73) Assignee: LYCEUM TECHNOLOGIES INC, Newark, DE (US)

( * ) Notice: Subject to any disclaimer, the term of this patent is extended or adjusted under 35 U.S.C. 154(b) by 0 days.

(21) Appl. No.: 18/095,460

(22) Filed: Jan. 10, 2023

(51) Int. Cl.
| | |
|---|---|
| *G06F 16/438* | (2019.01) |
| *G06F 16/954* | (2019.01) |
| *G06F 40/103* | (2020.01) |
| *H04N 21/2387* | (2011.01) |
| *G06F 16/958* | (2019.01) |
| *G06F 16/957* | (2019.01) |

(52) U.S. Cl.
CPC ........ *G06F 16/4393* (2019.01); *G06F 16/954* (2019.01); *G06F 40/103* (2020.01); *G06F 16/958* (2019.01); *G06F 16/9577* (2019.01); *H04N 21/2387* (2013.01)

(58) Field of Classification Search
CPC .......................... G06F 40/103; G06F 16/4393
See application file for complete search history.

(56) References Cited

U.S. PATENT DOCUMENTS

| | | | | |
|---|---|---|---|---|
| 2010/0058220 A1* | 3/2010 | Carpenter | ............. | G06Q 30/02 |
| | | | | 715/772 |
| 2015/0221000 A1* | 8/2015 | Cohen-Martin | ....... | G06Q 30/02 |
| | | | | 705/14.73 |
| 2020/0304879 A1* | 9/2020 | Ellingford | ........ | H04N 21/47217 |

* cited by examiner

*Primary Examiner* — Scott T Baderman
*Assistant Examiner* — Seung Woon Jung

(57) ABSTRACT

The embodiments herein relate to a method for enabling navigation of a personalized hybrid webpage through video segments on a user device. The method includes (i) generating the personalized hybrid webpage at a hybrid webpage server, the personalized hybrid webpage includes a first subtopic container that corresponds to a first content, a second subtopic container that corresponds to a second content, a first screen component, and the embedded video, (ii) streaming a first video segment associated with the first content on the first screen component from the hybrid webpage server by synchronizing a first narrator video with a first background content, (iii) navigating the personalized hybrid webpage from the first screen component to a second screen component by transitioning the embedded video from the first video segment to a second video segment in response to an action on an overlay element. The overlay element is positioned outside the embedded video.

15 Claims, 15 Drawing Sheets

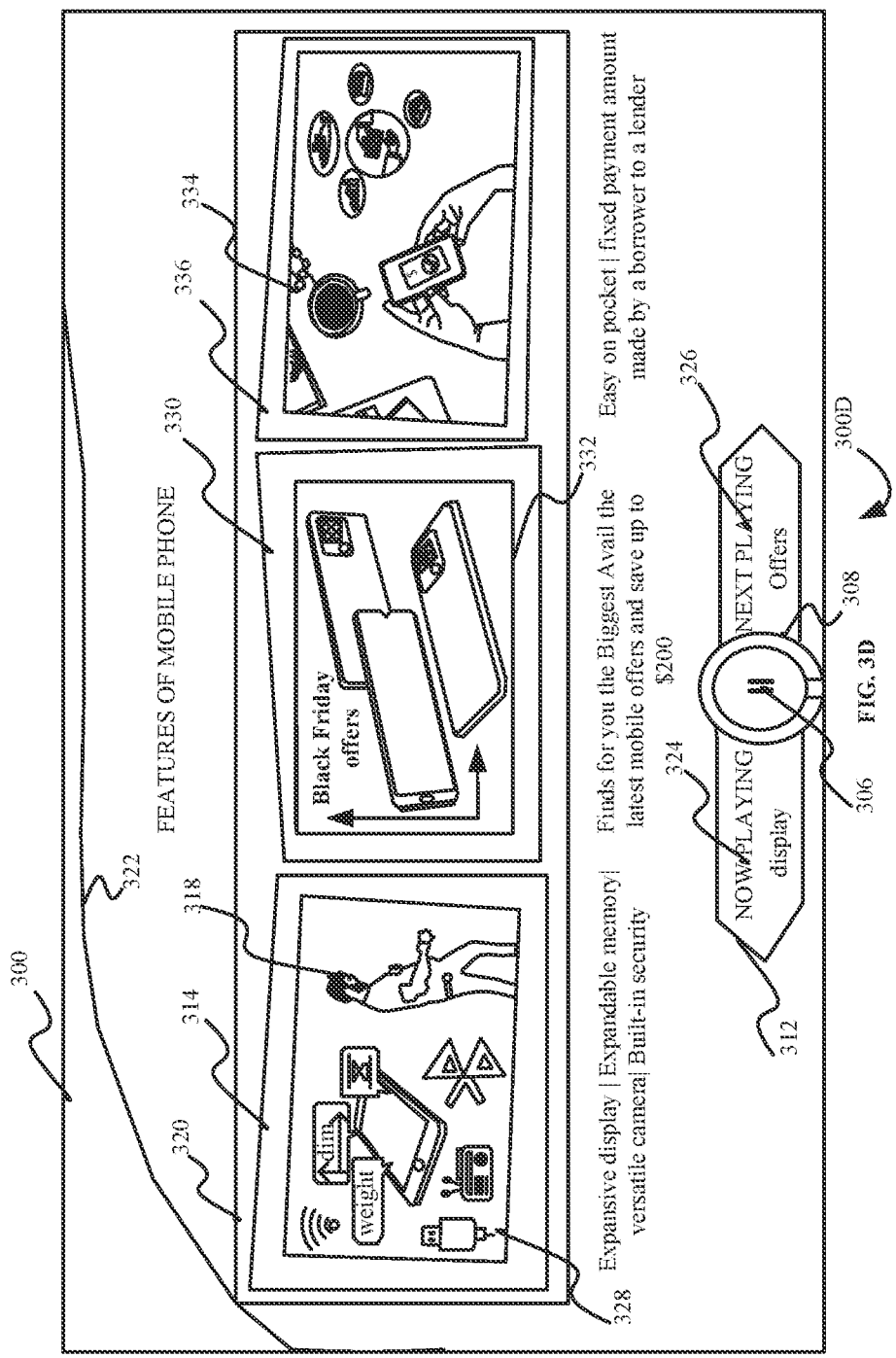

SYSTEM AND METHOD FOR ENABLING AN INTERACTIVE NAVIGATION OF A HYBRID MEDIA WEBPAGE

BACKGROUND

Technical Field

The present disclosure relates to rendering multimedia content through a computer network, and more specifically, a system and method for enabling navigation of a hybrid webpage through video segments on a user device.

Description of the Related Art

On the Internet, communication has evolved in many forms for many purposes. To communicate effectively, sharing of video content on websites has developed and is supported by several websites, weblogs, blogs, and other websites dedicated to publishing user-generated content. On average, thousands of videos are uploaded daily on the internet, which number is increasing as the tools and opportunities for capturing video become easier to use and more widespread. The videos are typically viewed on a video hosting website, for example, YouTube.

The users browsing the video hosting website can find videos of interest by, for example, searching for videos, browsing video directories, or sorting videos by ratings assigned to the videos. In these videos, the narrator or presenter must be able to maintain the attention of the user. Digital documents have a variety of media content types which are large content to present the cohesion of the topic. The problem is that most interface designs used in electronic narration applications revolve around undefined multi-layered presentations with no predefined boundaries. Nonetheless, the topic sequences are presented to the user through multiple window displays triggered by hyperlinks, and this requires the interface of the user to exit one sequence of the topic to experience a new sequence, and the user loses their attention towards the presenter video. The existing systems fails to maintain the recipient's or user's attention to make the communication interactive when a recipient is invited to interact as part of the communicative process.

The existing video hosting sites allow users to create video playlists associated with a personal account on the host site. These playlists include a set of videos selected by a user from a video database. For example, the user may create a playlist by compiling relevant product features related to videos for a business proposal, their favorite vlog videos, favorite music videos, favorite movie clips, etc. These playlists can be stored and retrieved later by the account holder through the host site. However, the existing video hosting sites allows the user to play the user-selected playlists of videos in a sequential order.

In another existing system, the publishers of websites embed the video content directly into their web pages. Some existing host sites provide publishing tools for generating an embed code that can be inserted into an external website. Moreover, the existing system streams a video from the host site to display the video in an embedded player on the external website when the embed code is executed.

In other existing systems, the creator of the video takes the flat media elements, which can include images, text, audio, animation, and even video clips, and organize the flat media contents on a timeline in a certain order, and add effects such as narration, transitions between visual elements such as scenes or images, synchronize between audio and visual, create a soundtrack. Though, the required tasks are typically carried out manually using well-known video editing tools. The existing webpage system includes richer forms of content like images or videos that can help to visualize or convey information better than texts, but they cannot replace one another. Moreover, plain videos are limited as they can only be consumed linearly, (i.e.) one frame is visible at a time which limits the amount of data consumed at each time. Moreover, the entire video needs to be watched at a time to get an idea about the concept. However, the texts consume more space or need to be more visualized on the screen.

Accordingly, there remains a need for a more efficient method for mitigating and/or overcoming drawbacks associated with current methods and systems in enabling the navigation of a hybrid webpage through video segments on a user device.

SUMMARY

In view of the foregoing, there is provided a process-implemented method for enabling navigation of a personalized hybrid webpage that is rendered on a user device. The method includes generating the personalized hybrid webpage at a hybrid webpage server. The personalized hybrid webpage includes a first subtopic container that corresponds to a first content associated with a first subtopic, a second subtopic container that corresponds to a second content associated with a second subtopic, a first screen component, and an embedded video. The embedded video includes a first video segment associated with the first subtopic and the second subtopic and a second video segment associated with a third content. The method includes streaming the first video segment associated with the first subtopic on the first screen component from the hybrid webpage server to be played on the user device. The first video segment includes a first narrator video and a first background content. The first video segment is generated by synchronizing the first narrator video with the first background content. The first background content includes at least a part of the first content. The first narrator video includes displaying a narrator narrating a narrator content that is associated with the at least the part of the first content. The method includes navigating the personalized hybrid webpage from the first screen component to a second screen component by transitioning the embedded video from the first video segment to the second video segment in response to an action on an overlay element. The action is received on the overlay element that is positioned outside of the first screen component or the embedded video.

In some embodiments, the method further includes modifying at least one of a first position or a first size of the first narrator video dynamically relative to at least one of a second position or a second size of the first background content when the embedded video navigates from the first subtopic container that is selected from one or more subtopic containers that is played on the first screen component to the second subtopic container that is selected from the one or more subtopic containers that is played on the first screen component. The first video segment is associated with the one or more subtopic containers.

In some embodiments, the method further includes displaying the first narrator video by transitioning from the first screen component to the second component at the user device when the embedded video navigates from the first video segment that is selected from one or more video segments that is played on the first screen component to the second video segment that is selected from the one or more video segments that is played on the second screen component. The personalized hybrid webpage includes the second screen component. The embedded video includes the one or more video segments.

In some embodiments, the method further includes displaying an overall video progress indicator at the user device that indicates an extent to which the embedded video has traversed. The overall video progress indicator is positioned outside of the first screen component, the second screen component, and the embedded video.

In some embodiments, the method further includes displaying a playback controller that includes a video segment progress indicator and the overlay element at the user device. The video segment progress indicator indicates a progression of a video segment that is selected from the one or more video segments of the embedded video. The video segment progress indicator is positioned outside of one or more screen components, and the personalized hybrid webpage includes the one or more screen components.

In some embodiments, the method for enabling the navigation of the personalized hybrid webpage further includes dynamically modifying at least one of (i) a third position relative to other visual components of the personalized hybrid webpage, or (ii) an appearance of the playback controller at the user device corresponding to a change in a state of playing of the embedded video. The state of playing is selected from any of (a) during playing, and (b) after playing. The personalized hybrid webpage includes one or more visual components that are displayed on the user device.

In some embodiments, the method further includes transforming a second thumbnail image into the second video segment when the first narrator video is displayed as transitioning from the first screen component to the second screen component. The second screen component includes the second thumbnail image.

In some embodiments, the method further includes automatically mapping a text or an image associated with one or more background contents with the narrator content of a narrator video to identify at least one timestamp for the one or more video segments. The narrator video includes one or more narrator videos.

In some embodiments, the method further includes automatically identifying the first video segment by synchronizing the first narrator video with the first background content from the one or more narrator videos and the one or more background content based on the at least one timestamp. The one or more narrator videos include the first narrator video and a second narrator video.

In some embodiments, the method further includes automatically personalizing the narrator content of the narrator video based on at least one of a name of a user associated with the user device, or a name of a company associated with the user.

In an aspect, a system for enabling navigation of a personalized hybrid webpage rendered on a user device is provided. The system includes a memory that stores a set of instructions and a processor that is configured to execute the set of instructions. The processor is configured to generate the personalized hybrid webpage at a hybrid webpage server. The personalized hybrid webpage includes a first subtopic container that corresponds to a first content associated with a first subtopic, a second subtopic container that corresponds to a second content associated with a second subtopic, a first screen component, and an embedded video. The embedded video includes a first video segment associated with the first subtopic and the second subtopic and a second video segment associated with a third content. The processor is configured to stream the first video segment associated with the first subtopic on the first screen component from the hybrid webpage server to be played on the user device by synchronizing a first narrator video with a first background content. The first video segment includes the first narrator video and the first background content. The first background content includes at least a part of the first content. The first narrator video includes displaying a narrator narrating a narrator content that is associated with the at least the part of the first content. The processor is configured to navigate the personalized hybrid webpage from the first screen component container to a second screen component by transitioning the embedded video from the first video segment to the second video segment in response to an action on an overlay element. The action is received on the overlay element that is positioned outside of the first screen component or the embedded video.

In some embodiments, the processor is further configured to modify at least one of a first position or a first size of the first narrator video dynamically relative to at least one of a second position or a size of the first background content when the embedded video navigates from the first subtopic container that is selected from one or more subtopic containers that is played on the first screen component to the second subtopic container that is selected from the one or more subtopic containers that is played on the first screen component. The first video segment is associated with the one or more subtopic containers.

In some embodiments, the processor is further configured to display the first narrator video by transitioning from the first screen component to the second component at the user device when the embedded video navigates from the first video segment that is selected from one or more video segments that is played on the first screen component to the second video segment that is selected from the one or more video segments that is played on the second screen component. The personalized hybrid webpage includes the second screen component.

In some embodiments, the processor is configured to display an overall video progress indicator at the user device that indicates an extent to which the embedded video has traversed. The overall video progress indicator is positioned outside of the first screen component, the second screen component, and the embedded video.

In some embodiments, the processor is further configured to display a playback controller that includes a video segment progress indicator and the overlay element at the user device. The video segment progress indicator indicates a progression of a video segment that is selected from the one or more video segments of the embedded video. The video segment progress indicator is positioned outside of one or more screen components. The personalized hybrid webpage includes the one or more screen components.

In some embodiments, the processor is further configured to enable the navigation of the personalized hybrid webpage by dynamically modifying at least one of (i) a third position relative to other visual components of the personalized hybrid webpage, or (ii) an appearance of the playback controller at the user device corresponding to a change in a state of playing of the embedded video. The state of playing is selected from any of (a) during playing, and (b) after playing. The personalized hybrid webpage includes one or more visual components displayed on the user's device.

In some embodiments, the processor is further configured to transform a second thumbnail image into the second video segment when the first narrator video is displayed as transitioning from the first screen component to the second screen component. The second screen component includes the second thumbnail image.

In some embodiments, the processor is further configured to automatically map a text or an image associated with one or more background content with the narrator content of a narrator video to identify at least one timestamp for the one or more video segments. The narrator video includes one or more narrator videos.

In some embodiments, the processor is further configured to automatically synchronize the first narrator video with the first background content from the one or more narrator videos and the one or more background content based on the at least one timestamp. The one or more narrator videos include the first narrator video and a second narrator video.

In another aspect, there is provided one or more non-transitory computer-readable storage mediums storing one or more sequences of instructions, which when executed by one or more processors, causes a method for enabling navigation of a personalized hybrid webpage that is rendered on a user device. The method includes generating the personalized hybrid webpage at a hybrid webpage server. The personalized hybrid webpage includes a first subtopic container that corresponds to a first content associated with a first subtopic, a second subtopic container that corresponds to a second content associated with a second subtopic, a first screen component, and an embedded video. The embedded video includes a first video segment associated with the first subtopic and the second subtopic and a second video segment associated with a third content. The method includes streaming the first video segment associated with the first subtopic on the first screen component from the hybrid webpage server to be played on the user device, by synchronizing a first narrator video with a first background content. The first video segment includes the first narrator video and the first background content. The first background content includes at least a part of the first content. The first narrator video includes displaying a narrator narrating a narrator content that is associated with the at least the part of the first content. The method includes navigating the personalized hybrid webpage from the first screen component to a second screen component by transitioning the embedded video from the first video segment to the second video segment in response to an action on the overlay element. The action is received on the overlay element that is positioned outside of the first screen component or the embedded video.

The system for enabling navigation of a personalized hybrid webpage through one or more video segments that is rendered on a user device to provide a seamless experience for the user. The system provides an accurate synchronization between the narrator's video and the background content of video segments during playback. The system maintains the synchronization even if at least one timestamp of each playback process is different. Further, the system provides synchronization throughout the playback process even if data streams of the narrator's videos and the background content of the video segments are delayed. The system displays the entire information in front of the end consumer or the user and highlights the important part of the background content during the playback of the narrator's video. Moreover, the system individually consumes different parts of the content of the embedded video to provide an immersive experience to the user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 3D is an exemplary user interface view that illustrates transitioning a narrator through video segments in the personalized hybrid webpage according to some embodiments herein;

DETAILED DESCRIPTION

Figure 1:
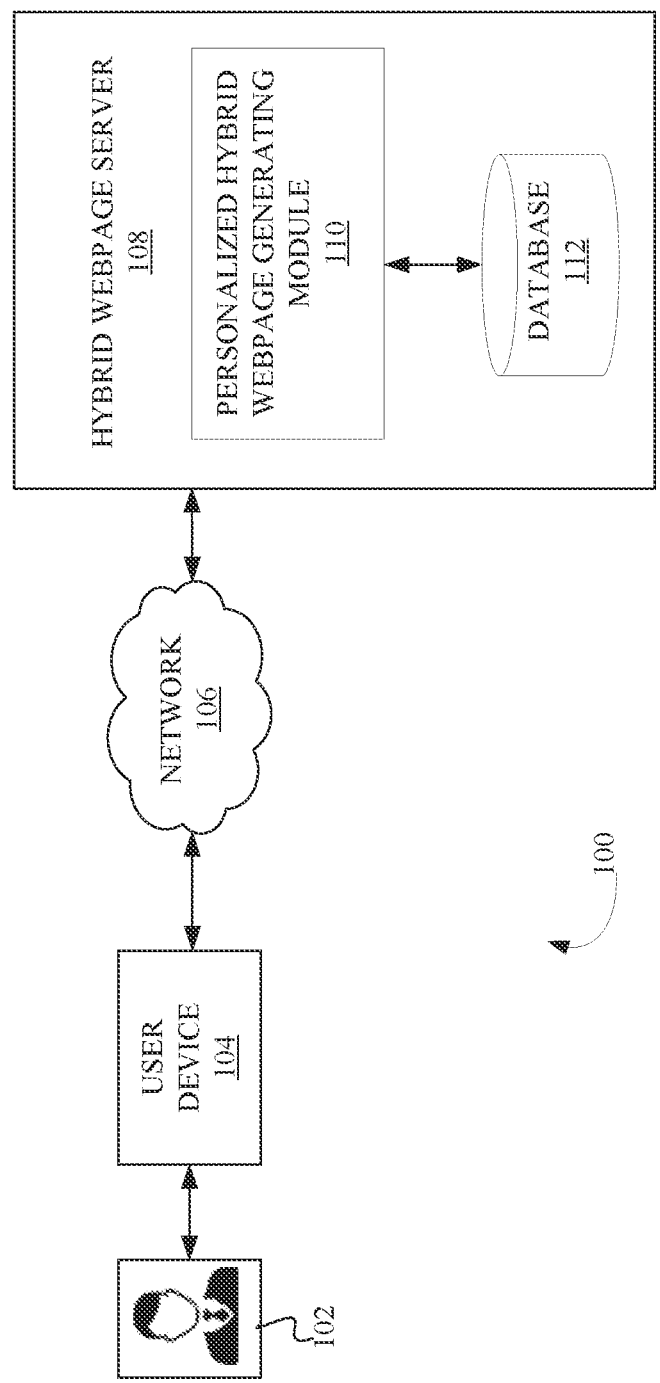
FIG. 1 is a block diagram that illustrates a system for enabling navigation of a hybrid webpage through video segments on a user device according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide a system and a method for enabling the navigation of a hybrid webpage through video segments on a user device. Referring now to the drawings, and more particularly to FIGS. 1 through 6, where similar reference characters denote corresponding features consistently throughout the figure's, preferred embodiments are shown.

FIG. 1 is a block diagram that illustrates a system 100 for enabling navigation of a personalized hybrid webpage through video segments on a user device 104 of FIG. 1 according to some embodiments herein. The system 100 includes the user device 104 associated with a user 102, and a hybrid webpage server 108. The hybrid webpage server 108 includes a personalized hybrid webpage generating module 110, and a database 112. A list of devices that are capable of functioning as the hybrid webpage server 108, without limitation, may include any of a personal computer, a laptop, a tablet device, a smartphone, a mobile communication device, a personal digital assistant, or any other such computing device. In some embodiments, the user device 104, without limitation, is selected from a personal computer, a laptop, a tablet device, a smartphone, a mobile communication device, a personal digital assistant, or any other such computing device. The hybrid webpage server 108 may be communicatively connected with the user device 104 through a network 106. In some embodiments, the network 106 is a wireless network. In some embodiments, the network 106 is a combination of the wired network and the wireless network. In some embodiments, the network 106 is the Internet.

The hybrid webpage server 108 includes a memory that stores a set of instructions and a processor that is configured to execute the set of instructions. The processor is configured to enable the personalized hybrid webpage generating module 110 to generate the personalized hybrid webpage. The personalized hybrid webpage includes a first subtopic container that corresponds to a first content associated with a first subtopic, a second subtopic container that corresponds to a second content associated with a second subtopic, a first screen component, and an embedded video. The embedded video includes a first video segment associated with the first subtopic and the second subtopic and a second video segment associated with a third content.

In some embodiments, the hybrid webpage server 108 segments the embedded video into one or more video segments. Each of the one or more video segments has at least one frame that includes at least one image or text of at least one subtopic. The database 112 may be communicatively connected with the personalized hybrid webpage generating module 110 to store a generated personalized hybrid webpage in the memory and execute it on the user device 104. The personalized hybrid webpage is rendered on the user device 104 based on a combination of Hypertext Markup Language (HTML), Cascading Style Sheets (CSS), or JavaScript (JS). For example, the personalized hybrid webpage includes but is not limited to, a title, a description, a narrator video, an Autoplay button, a thumbnail, a text caption for each subtopic and each subtopic container, a name of the user 102, and a company name of the user 102, etc.

The personalized hybrid webpage generating module 110 automatically personalizes the narrator content of a narrator video based on the name of the user 102, or the name of the company associated with the user 102 in the personalized hybrid webpage. For example, in an introduction narrator video, if a viewer of the personalized hybrid webpage's name is John, the narrator video may be personalized to include a greeting like "Hey John!" in the personalized hybrid webpage.

The user device 104 streams the first video segment associated with the first subtopic on the first screen component from the hybrid webpage server 108 by synchronizing a first narrator video with a first background content. The first video segment includes the first narrator video and the first background content. The first background content includes at least a part of the first content. The first narrator video includes displaying a narrator narrating a narrator content that is associated with the at least the part of the first content. The hybrid webpage server 108 synchronizes the first narrator video with the first background content to generate the first video segment that is rendered to the user device 104 to stream on the first screen component.

The system 100 navigates the personalized hybrid webpage from the first screen component to a second screen component by transitioning the embedded video from the first video segment to the second video segment in response to an action on an overlay element. The action is received on the overlay element by the user 102 and the overlay element is positioned outside of the first screen component or the embedded video in the personalized hybrid webpage. The overlay element is associated with the one or more video segments and one or more subtopic containers.

Figure 2:
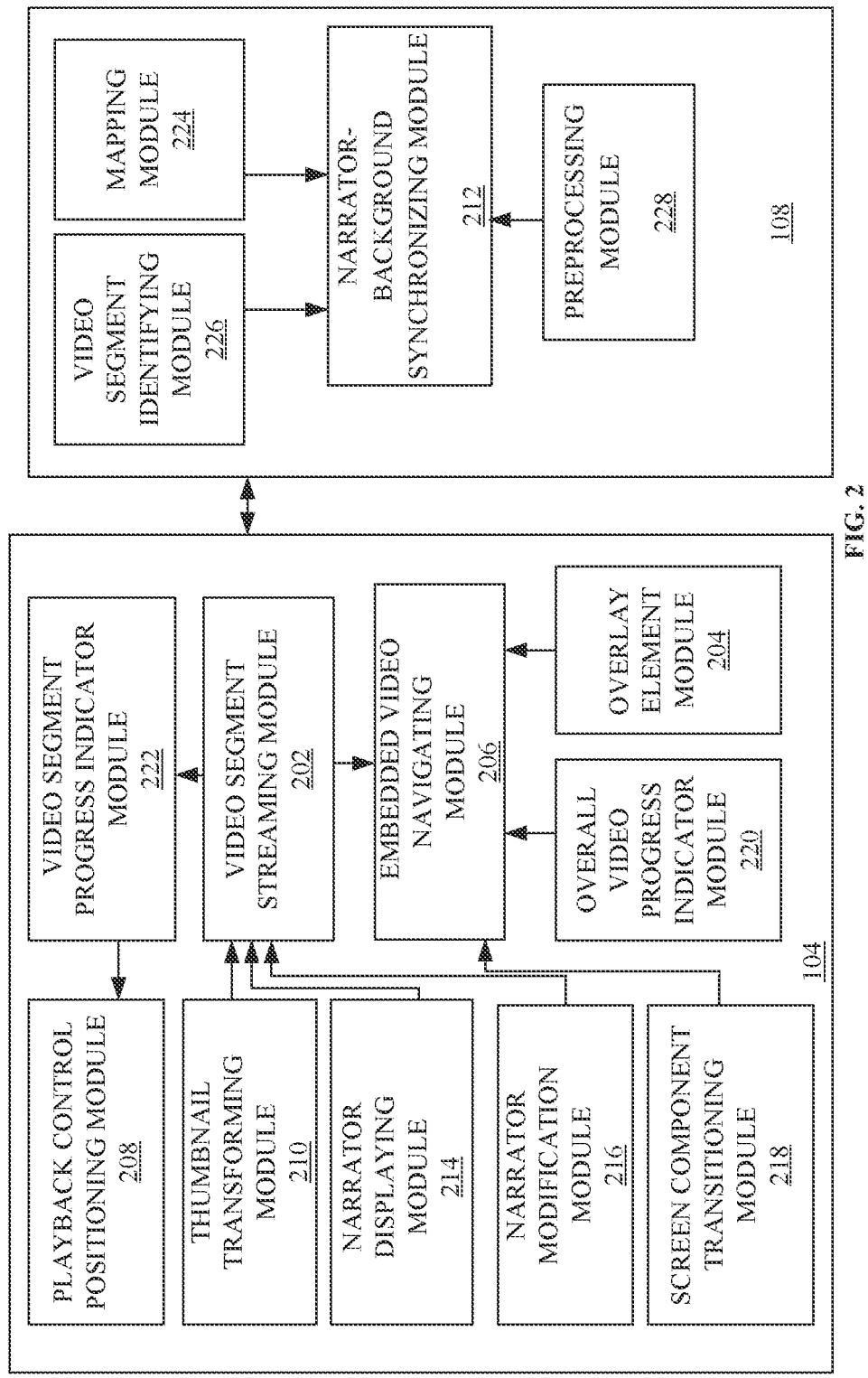
FIG. 2 is a block diagram that illustrates one or more modules of a user device and a hybrid webpage server of FIG. 1 according to some embodiments herein.

FIG. 2 is a block diagram that illustrates one or more modules of a user device 104 and a hybrid webpage server 108 of FIG. 1 according to some embodiments herein. The user device 104 includes a video segment streaming module 202, and an embedded video transitioning module 206. The video segment streaming module 202 is associated with a playback control positioning module 208, a video segment progress indicator module 222, a thumbnail transforming module 210, a narrator displaying module 214, a narrator modification module 216, and an overall video progress indicator module 220. The embedded video transitioning module 206 is associated with an overlay element module 204, a screen component transitioning module 218, and an overall video progress indicator module 220. The hybrid webpage server 108 includes a narrator background synchronizing module 212. The narrator background synchronizing module 212 is associated with a video segment identifying module 226, a mapping module 224, and a preprocessing module 228. The user device 104 is communicatively connected with the hybrid webpage server 108.

The video segment streaming module 202 streams a first video segment associated with a first subtopic on a first screen component in the view of the user interface by synchronizing a first narrator video with a first background content in the hybrid webpage server 108. The first video segment includes the first narrator video and the first background content. The first background content includes at least a part of a first content. The first narrator video includes displays a narrator narrating a narrator content that is associated with the at least the part of the first content. The narrator background synchronizing module 212 synchronizes the first narrator video with the first background content to generate the first video segment that is rendered to the video segment streaming module 202.

The mapping module 224 auto-maps a text or an image of the first content associated with the first background content with the narrator content of the first narrator video to identify a timestamp for synchronizing the first narrator video with the first background content accurately. The timestamp identifies a time range of each video segment in the embedded video.

In some embodiments, the mapping module 224 auto-maps the text or the image associated with one or more background content with the narrator content of one or more narrator videos to identify one or more timestamps for synchronizing the one or more narrator videos with the one or more background content. The one or more narrator videos include the first narrator video and a second narrator video.

The preprocessing module 228 automatically preprocesses the first narrator video to obtain foreground images of the first narrator video to stream the first narrator video on the first screen component without background noise. In some embodiments, the preprocessing module 228 automatically preprocess the one or more narrator videos to obtain the foreground images of the one or more narrator videos by (i) receiving one or more frames from the one or more narrator videos, (ii) generating a mask for one or more narrator images of the one or more narrator videos using artificial intelligence, (iii) deducting background images from each frame of the one or more narrator videos using the mask of the one or more narrator's images to obtain the foreground images of the one or more narrator videos. In some embodiments, the artificial intelligence is correlated with trained historical data of different resized human labels. For example, the human labels may be but are not limited to face area, hair area, clothes area, etc.

The thumbnail transforming module 210 transforms a first thumbnail image of the first video segment into the first video segment when the first narrator video is synchronized with the first background content in the first screen component at the user device 104. The first screen component includes the first thumbnail image of the first video segment.

The video segment identifying module 226 automatically identifies the first video segment by synchronizing the first narrator video with the first background content based on the timestamp to stream the first video segment on the first screen component.

In some embodiments, the video segment identifying module 226 automatically synchronizes the one or more narrator videos with the one or more background content to stream one or more video segments in one or more screen components. In some embodiments, the narrator's video may be segmented into the one or more narrator's videos at predetermined intervals in the embedded video.

The playback control positioning module 208 dynamically modifies at least one of (i) a third position relative to other visual components of an overlay element, or (ii) an appearance of a playback controller at the user device 104 which corresponds to a change in a state of playing of the embedded video when the first video segment starts streaming on the first screen component. The state of playing is selected from at least one of (a) during playing or (b) after playing.

The narrator displaying module 214 displays the first narrator video on the first screen component when the first narrator video transitions from a first subtopic container associated with the first content to a second subtopic container associated with a second content at the user device 104. In some embodiments, the narrator displaying module 214 displays a narrator video when the embedded video navigates from any one subtopic container that is selected from one or more subtopic containers that is played on the first screen component to another subtopic container that is selected from the one or more subtopic containers that is played on the first screen component.

The narrator modification module 216 modifies at least one of a first position or a first size of the first narrator video which is dynamically relative to at least a second position or a second size of the first background content when the first narrator video synchronizes with the first background content in the first screen component.

The video segment indicator module 222 indicates a progression of the first subtopic container associated with the first video segment that is selected from the one or more subtopic containers and that is played on the first screen component. The embedded video transitioning module 206 transitions the embedded video from the first video segment that is associated with the second subtopic container to a second video segment that is associated with a third content when the overlay element module 204 gets an action from a user 102, to navigate a personalized hybrid webpage from the first screen component to a second screen component. The overlay element module 204 is positioned outside the one or more screen components or the embedded video. The overlay element module 204 is associated with one or more subtopics. The one or more video segments include the first video segment and the second video segment.

The screen component transitioning module 218 transitions the first narrator video from the first screen component to the second component at the user device 104, in response to the action on the overlay element module 204 when the embedded video navigates from the first video segment that is selected from the one or more video segments that is played on the first screen component to the second video segment that is selected from the one or more video segments that is played on the second screen component.

In some embodiments, the screen component transitioning module 218 transitions the narrator video from one screen component to another screen component at the user device 104 when the embedded video navigates from any one video segment selected from the one or more video segments that is played on the first screen component to another video segment selected from the one or more video segments that is played on the second screen component in response to the action on the overlay element module 204. The overall video progress indicator module 222 indicates an extent to which the embedded video has traversed.

Figure 3A:
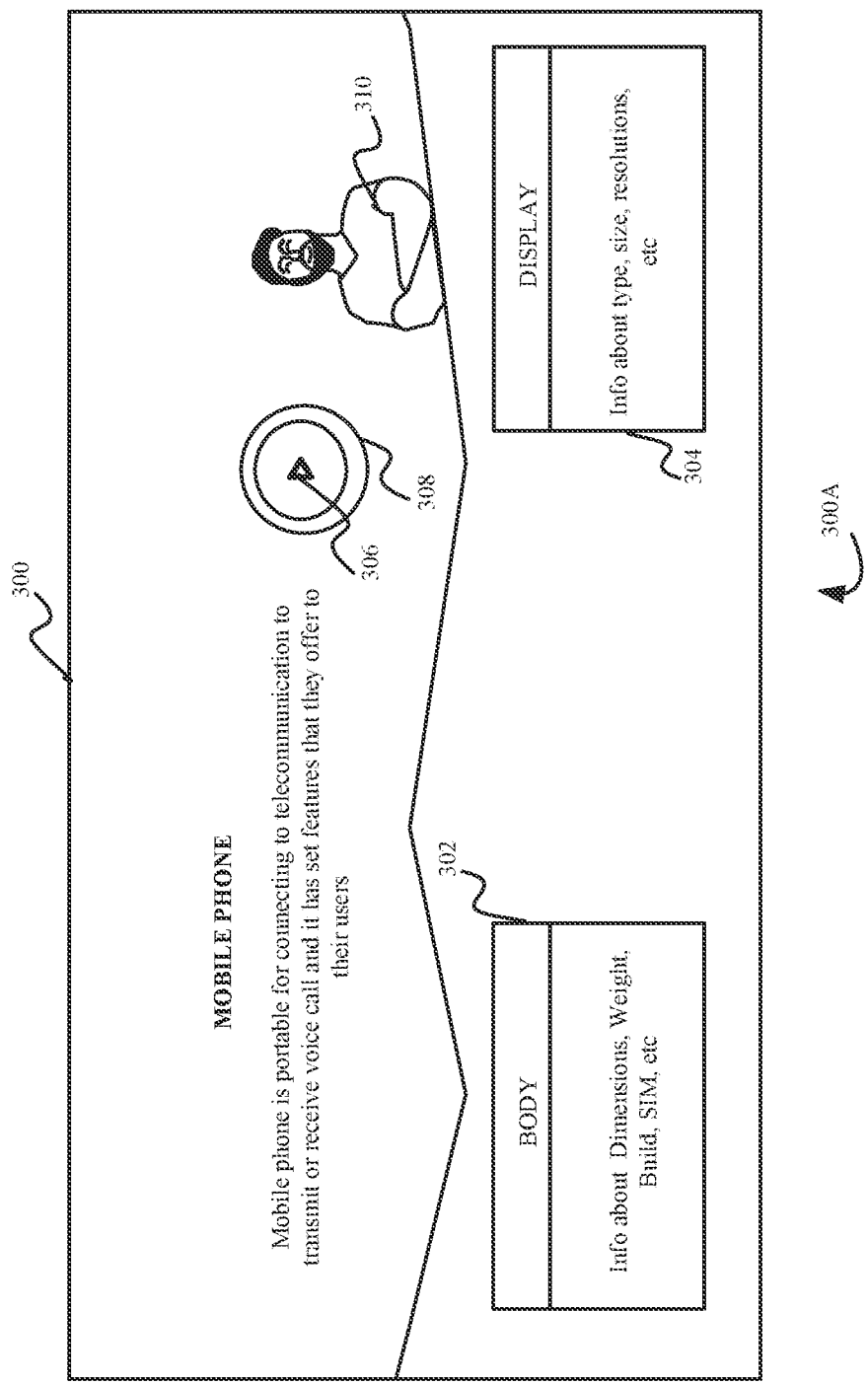
FIG. 3A is an exemplary user interface view that illustrates a personalized hybrid webpage of FIG. 1 according to some embodiments herein.

FIG. 3A is an exemplary user interface view 300A that illustrates a personalized hybrid webpage 300 of FIG. 1 according to some embodiments herein. The exemplary user interface view 300A depicts the personalized hybrid webpage 300 of selling mobiles. The personalized hybrid webpage 300 depicts a first subtopic container 302, a second subtopic container 304, and an introduction narrator video 310. The first subtopic container 302 includes a first content associated with a first subtopic. For example, the first subtopic is "body" and the first content is "Info about dimensions, weight, build, SIM, etc." as depicted in 302. The second subtopic container 302 includes a second content associated with a second subtopic. For example, the second subtopic is "display" and the second content is "Info about a type, a size, resolutions, etc." as depicted in 304. The personalized hybrid webpage 300 depicts a playback controller 306 associated with a video segment progress indicator 308 that is positioned on the personalized hybrid webpage 300. The introduction narrator video 310 of a narrator content is automatically personalized based on a name of user 102, or a name of a company associated with the user 102 in the personalized hybrid webpage 300 to include a like greeting when the introduction narrator video 310 synchronizes with the personalized hybrid webpage 300 through the name of the user 102 that uses the user device 104.

Figure 3B:
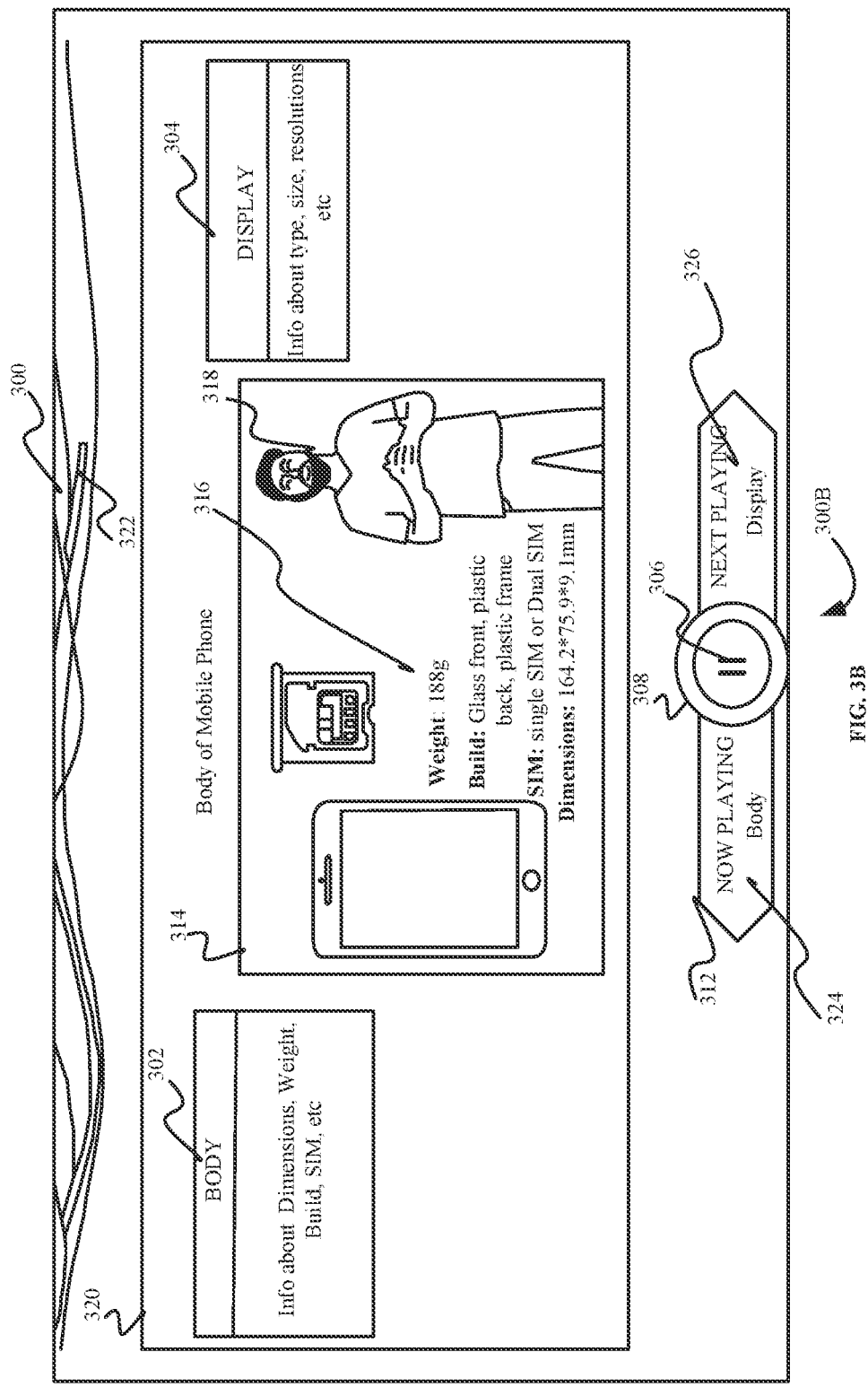
FIG. 3B is an exemplary user interface view that illustrates a modified playback controller in the personalized hybrid webpage according to some embodiments herein.

FIG. 3B is an exemplary user interface view 300B that illustrates a modified playback controller 306 of the personalized hybrid webpage 300 according to some embodiments herein. The personalized hybrid webpage 300 depicts an embedded video 320 that includes a first video segment that is associated with the first screen component 314. The first video segment relates to the first subtopic container 302. The first video segment includes a first background content 316 of the first subtopic container 302 and a first narrator video 318 of the first subtopic container 302. The personalized hybrid webpage 300 depicts an overall video segment indicator 322 that indicates an extent to which the embedded video 320 has traversed that is positioned outside the first screen component 314 or the embedded video 320. The personalized hybrid webpage 300 depicts an overlay element 312 associated with the playback controller 306, the video segment indicator 308, a label of now playing 324, and next playing 326. The overlay element 312 is associated with one or more subtopic containers. The playback back controller 306 is associated with at least one video playback control element, a video pause control element, and the video segment progress indicator 308.

The personalized hybrid webpage 300 depicts the modified playback controller as shown in FIG. 3B. In some embodiments, the appearance of the playback controller 306 is dynamically modified to the appearance of the playback controller 306 associated with a label of a "state of playing" when the first video segment associated with the first subtopic starts streaming on the first screen component 314 at the user device 104. The appearance of the playback controller 306 is dynamically modified with respect to a change in the state of playing of the embedded video 320 at the user device 104. The state of playing includes the label of a now playing 324, and a next playing 326.

The overlay element 312 displays the first subtopic in the label "now playing" when the first background content of the first subtopic is streaming on the first screen component 314, for example, the label "now playing" displays the subtopic is the "body". The overlay element 312 displays the second subtopic in the label "next playing" when the first background content of the second subtopic has to stream on the first screen component 314, for example, the label "next playing" displays the subtopic is the "display". In some embodiments, the system 100 automatically navigates a video segment from one subtopic container to another subtopic container in sequential order.

The personalized hybrid webpage 300 depicts a first position and a first size of the first narrator video 318 is modified based on a second position or a second size of the first background content 316 of the first subtopic container 302 when the first narrator video 318 synchronizes with the first background content 316 in the first screen component 314. The personalized hybrid webpage 300 depicts pointing up at least one part of the first background content 316 associated with the first subtopic container 302 when the first narrator video 318 narrates the narrator content that is associated with the first subtopic container 302.

Figure 3C:
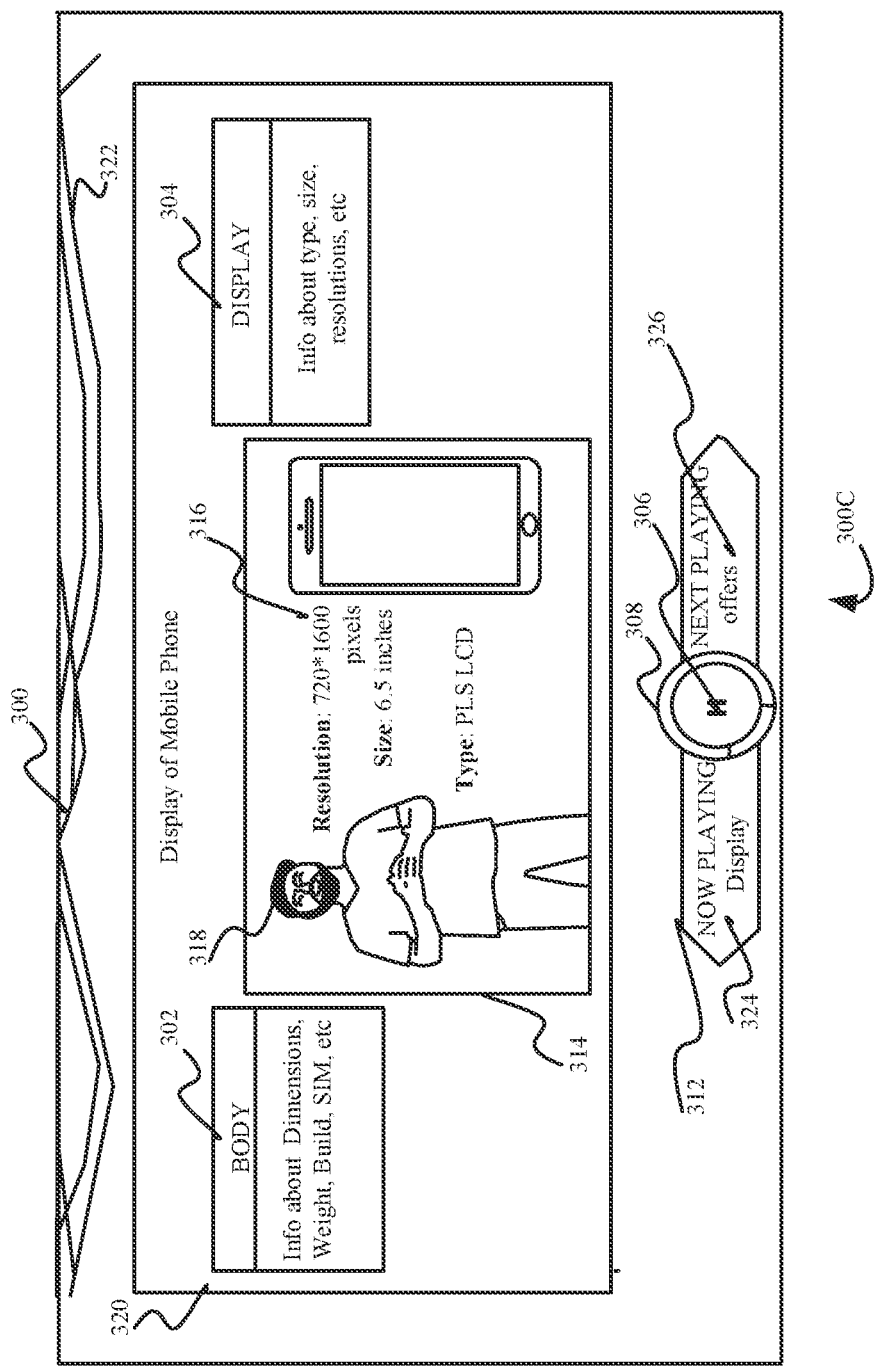
FIG. 3C is an exemplary user interface view that illustrates modifying a position and size of a narrator in the personalized hybrid webpage according to some embodiments herein.

FIG. 3C is an exemplary user interface view 300C that illustrates modifying a position and size of a narrator in the personalized hybrid webpage 300 according to some embodiments herein. The personalized hybrid webpage 300 depicts an embedded video 320 that includes the second video segment includes the first narrator video 318 and the first background content 316 which is associated with a first screen component 314. The second video segment relates to the second subtopic container 304. The personalized hybrid webpage 300 depicts the first background content 316 relates to the second subtopic container 304 in the first screen component 314.

The personalized hybrid webpage 300 depicts a modified first position and first size of the first narrator video 318 as shown in 314. The first position and first size of the first narrator video 318 are modified based on the at least second position or second size of the first background content 316 of the second subtopic container 304 using a narrator modification module 216 when the first narrator video 318 transitions from the first subtopic container 302 to the second subtopic container 304. The personalized hybrid webpage 300 depicts that pointing up at least one part of the first background content 316 of the second subtopic container 304 in the first screen component 314 when the first narrator video 318 narrates the first background content 316 of the second subtopic container 304. For example, the first background content 316 of the second subtopic container 304 is "resolution: 720*1600 pixels, size 6.5 inches, type: PLS LCD" as shown in 314.

FIG. 3D is an exemplary user interface view 300D that illustrates transitioning a narrator through video segments in the personalized hybrid webpage 300 according to some embodiments herein. The personalized hybrid webpage 300 depicts an embedded video 320 includes the first video segment associated with the first screen component 314, the second video segment associated with a first screen component 314, and a third video segment associated with a second screen component 330. The personalized hybrid webpage 300 depicts a first thumbnail image 328 associated with the first screen component 314 and a second thumbnail image 332 associated with the second screen component 330, and a third thumbnail image 334 associated with the third screen component 336.

The personalized hybrid webpage 300 depicts navigation of embedded video 320 when the embedded video 320 transitions from the first video segment associated with the first subtopic container 302 on the first screen component to display the second video segment associated with the second subtopic container 304 in response to action on the overlay element 312. In some embodiments, the first narrator video 318 transitions from the first screen component 314 to the second screen component 330 at the user device 104 in response to the action on the overlay element 312.

The personalized hybrid webpage 300 depicts the overall video segment indicator 322 positioned outside the first screen component 314, the second screen component 330, the third screen component 336, or the embedded video 320. The personalized hybrid webpage 300 depicts the overlay element 312 positioned outside the first screen component 314, the second screen component 330, and the third screen component 336. The video segment progress indicator 308 provides a color code for a progression of a video segment. The color codes may be red, green, and yellow. For example, if the video segment progress indicator displays red color, it indicates that the video segment has not been played yet in the screen component. If the video segment progress indicator 308 displays green color, it indicates that the video segment has already been watched by user 102, and if the video segment progress indicator 308 displays the yellow color, it indicates that the video segment is playing on the screen component.

Figure 3E:
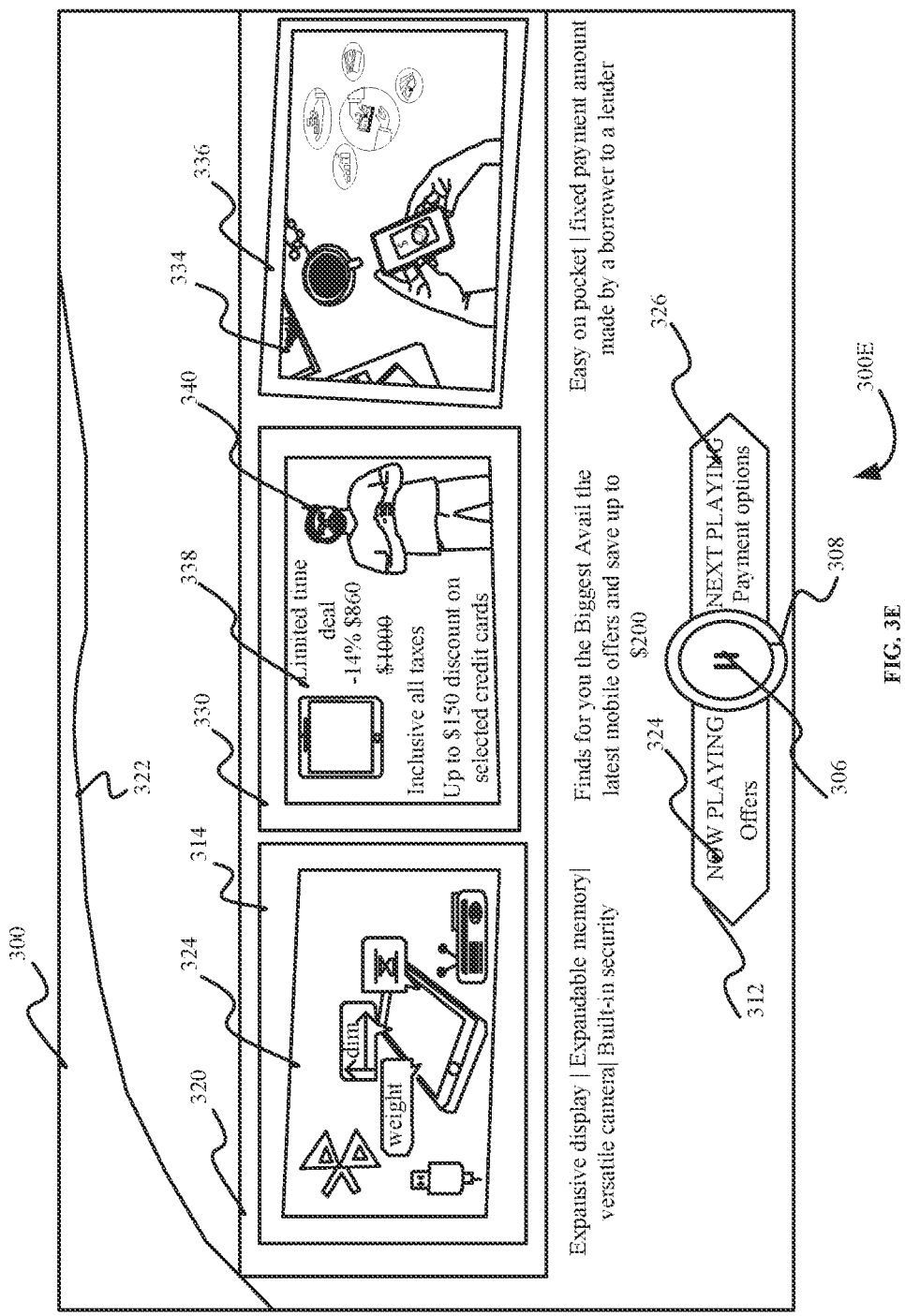
FIG. 3E is an exemplary user interface view that illustrates transforming a thumbnail image into a video segment in the personalized hybrid webpage according to some embodiments herein.

FIG. 3E is an exemplary user interface view 300E that illustrates transforming a thumbnail image into video segments in the personalized hybrid webpage 300E according to some embodiments herein. The personalized hybrid webpage 300 depicts a second narrator video 340 and a second background content 338 in the second screen component 330 when the first narrator video 318 transitions from the first screen component 314 to the second screen component 330 at the user device 104. The personalized hybrid webpage 300 depicts the second background content 338 that is related to a third content, for example, the second background content is "limited time deal", 14%, $860, $1000, "inclusive all taxes", up to $150 discounts on selected credit cards.

The personalized hybrid webpage 300 depicts transforming the second thumbnail image 332 into the second video segment by synchronizing the second narrator video 340 with the second background content 338 that relates to the third content when the first narrator video 318 transitions from the first screen component 314 to the second screen component 330 at the user device 104.

The personalized hybrid webpage 300 depicts a transition of the embedded video 320 from the first video segment into the third video segment in response to the action on the overlay element 312 to navigate the first narrator video 318 from the first screen component 314 to the second screen component 330.

Figure 3F:
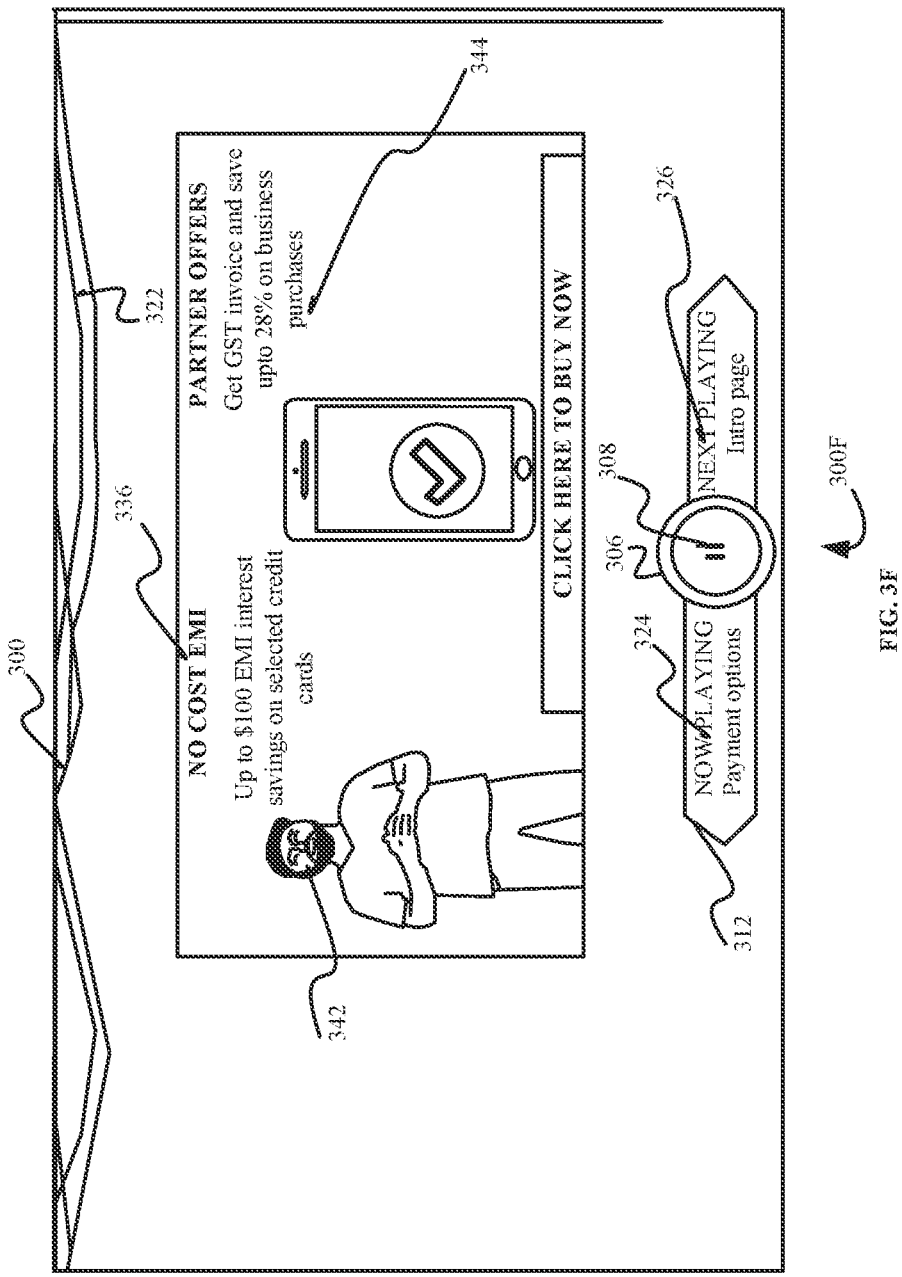
FIG. 3F is an exemplary user interface view that illustrates a call-to-action on the video segment in the personalized hybrid webpage according to some embodiments herein.

FIG. 3F is an exemplary user interface view 300F that illustrates a call-to-action on video segment in the personalized hybrid webpage 300 according to some embodiments herein. The personalized hybrid webpage 300 depicts the third screen component 330 includes a third background content 344 that is related to a fourth content, and a third narrator video 342. The personalized hybrid webpage 300 depicts the third narrator video 342 narrates the third background content 344 in the third screen component 336. The third screen component displays the call-to-action element like "click here to buy now" at end of the third video segment.

Figure 4A:
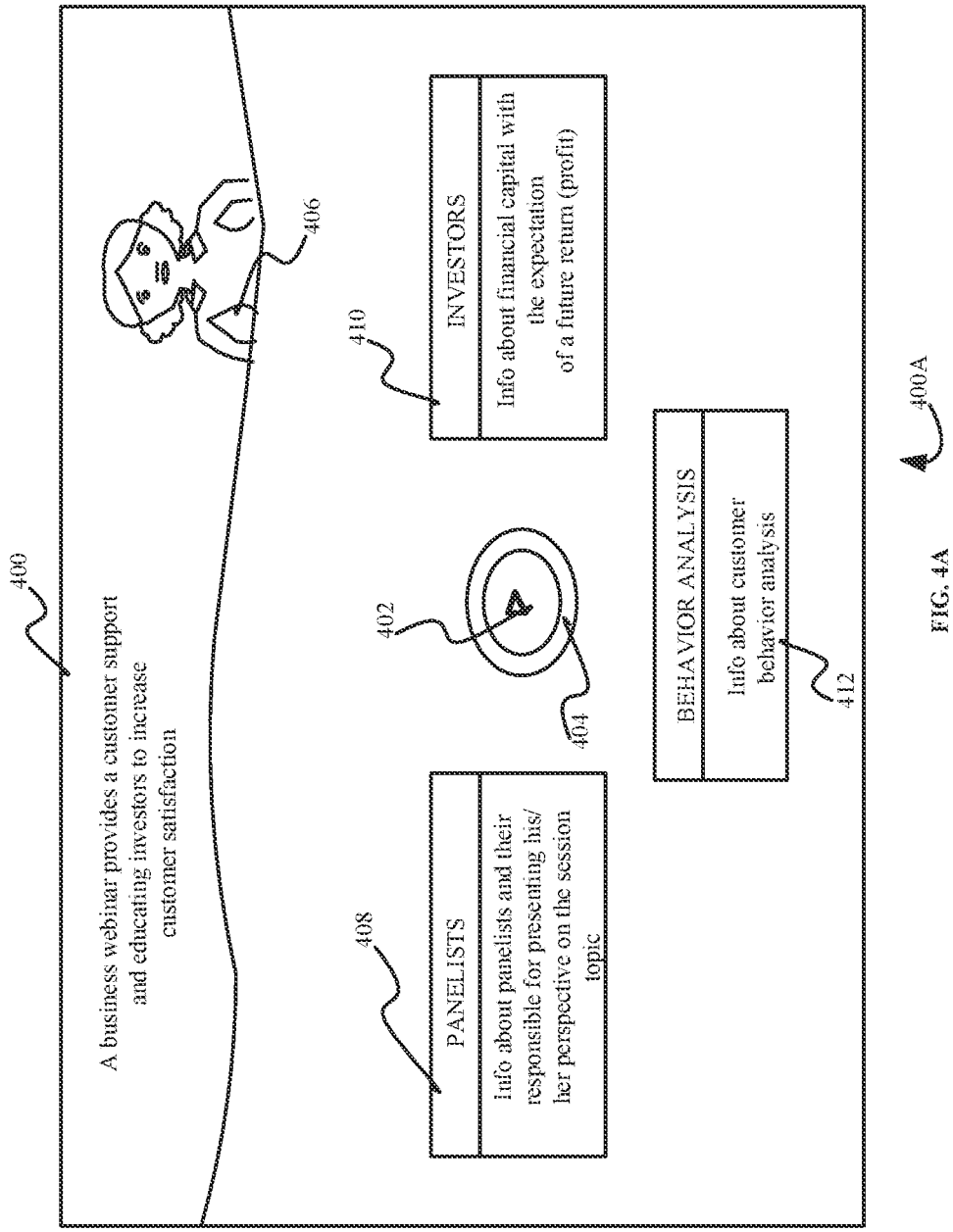
FIG. 4A illustrates an exemplary user interface view that illustrates a personalized hybrid webpage of FIG. 1 according to some embodiments herein.

FIG. 4A is an exemplary user interface view 400A that illustrates a personalized hybrid webpage 400 of FIG. 1 according to some embodiments herein. The exemplary user interface view 400A is the personalized hybrid webpage 400 of webinar registration. The personalized hybrid webpage 400 depicts a first subtopic container 408, a second subtopic container 410, a third subtopic container 412, a playback controller 402 associated with a video segment indicator 404, and an intro narrator video 406. The first subtopic container 408 includes a first content associated with a first subtopic. The second subtopic container 410 includes a second content associated with a second subtopic. The third subtopic container 412 includes a third content associated with a third subtopic. The playback controller 402 is associated with the video segment progress indicator 404 which is positioned on the personalized hybrid webpage 400. The personalized hybrid webpage 400 depicts the intro narrator video 406 that automatically personalized a narrator's content based on a name of user 102, or a name of a company associated with the user 102 in the personalized hybrid webpage 400 like greeting when the intro narrator video 406 synchronizes with the personalized hybrid webpage 400 through the name of the user 102 that uses the user device 104.

Figure 4B:
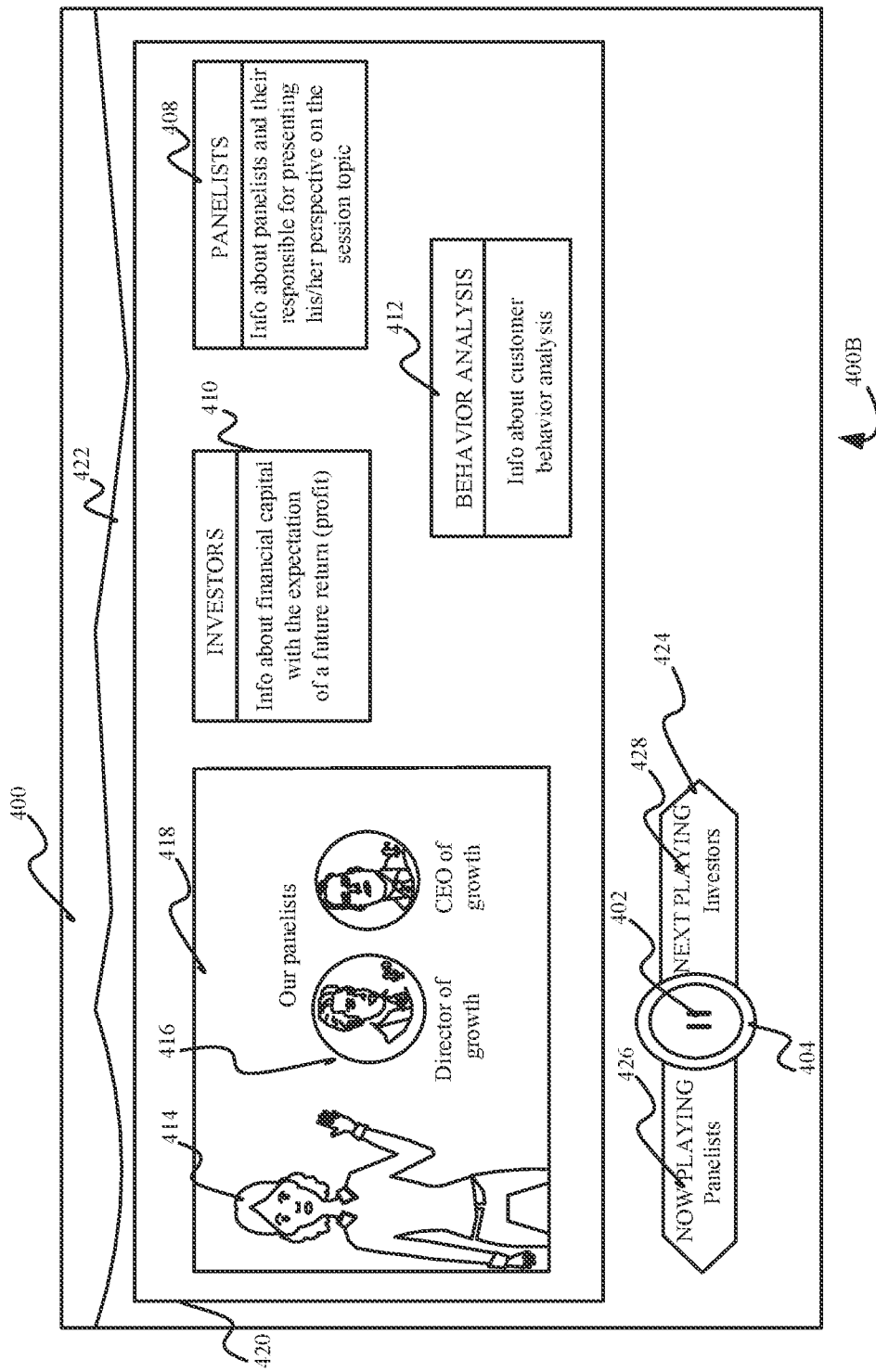
FIG. 4B illustrates an exemplary user interface view that illustrates a modified playback controller in the personalized hybrid webpage according to some embodiments herein.

FIG. 4B is an exemplary user interface view 400B that illustrates modifying a position and size of a narrator of the personalized hybrid webpage 400 according to some embodiments herein. The personalized hybrid webpage 400B depicts an overlay element 424 that is associated with the playback controller 402, the video segment indicator 404, a label of now playing 426, and a next playing 428. The personalized hybrid webpage 400B depicts an embedded video 420 that includes a first video segment that is related to a first narrator video 414 and a first background content 416. The personalized hybrid webpage 400B depicts modified a first position and a first size of the first narrator video 414. The first position and a first size of the first narrator video 414 are modified based on a second position or second size of the first background content 416 of the first subtopic container 408 when the first narrator video 414 synchronizes with the first background content 416 in the first screen component 418.

The first position and the first size of the first narrator video 414 are modified when the intro narrator video 406 automatically transitions to the first screen component 418 or when the intro narrator video 406 transitions to the first screen component 418 in response to an action in the playback controller 402. The personalized hybrid webpage 400 depicts that pointing up at least one part of the first background content 416 is associated with the first subtopic container 408 when the first narrator video 414 narrates the first background content 416 relates to the first subtopic container 408.

The personalized hybrid webpage 400B depicts modified playback controller 402 as shown in FIG. 4B. In some embodiments, the appearance of the playback controller 402 is dynamically modified to the appearance of the playback controller 402 associated with a label of a "state of playing" when the first video segment associated with the first subtopic starts streaming on the first screen component 418 at the user device 104, or when the intro narrator video 406 transitions to the first screen component 418 in response to the action in an overlay element 424. The personalized hybrid webpage 300 depicts the modified playback controller as shown in FIG. 4B The playback controller 402 displays the first subtopic in a label "now playing" 426 when the first background content of the first subtopic is streaming on the first screen component 418, for example, the label "now playing" displays the subtopic as the "panelists". The playback controller 402 displays the second subtopic in the label "next playing" 428 when the first background content 416 of the second subtopic has to stream on the first screen component 418, for example, the label "next playing" displays the subtopic is the "investors". In some embodiments, a video segment automatically navigates from one subtopic container to another subtopic container in sequential order.

Figure 4C:
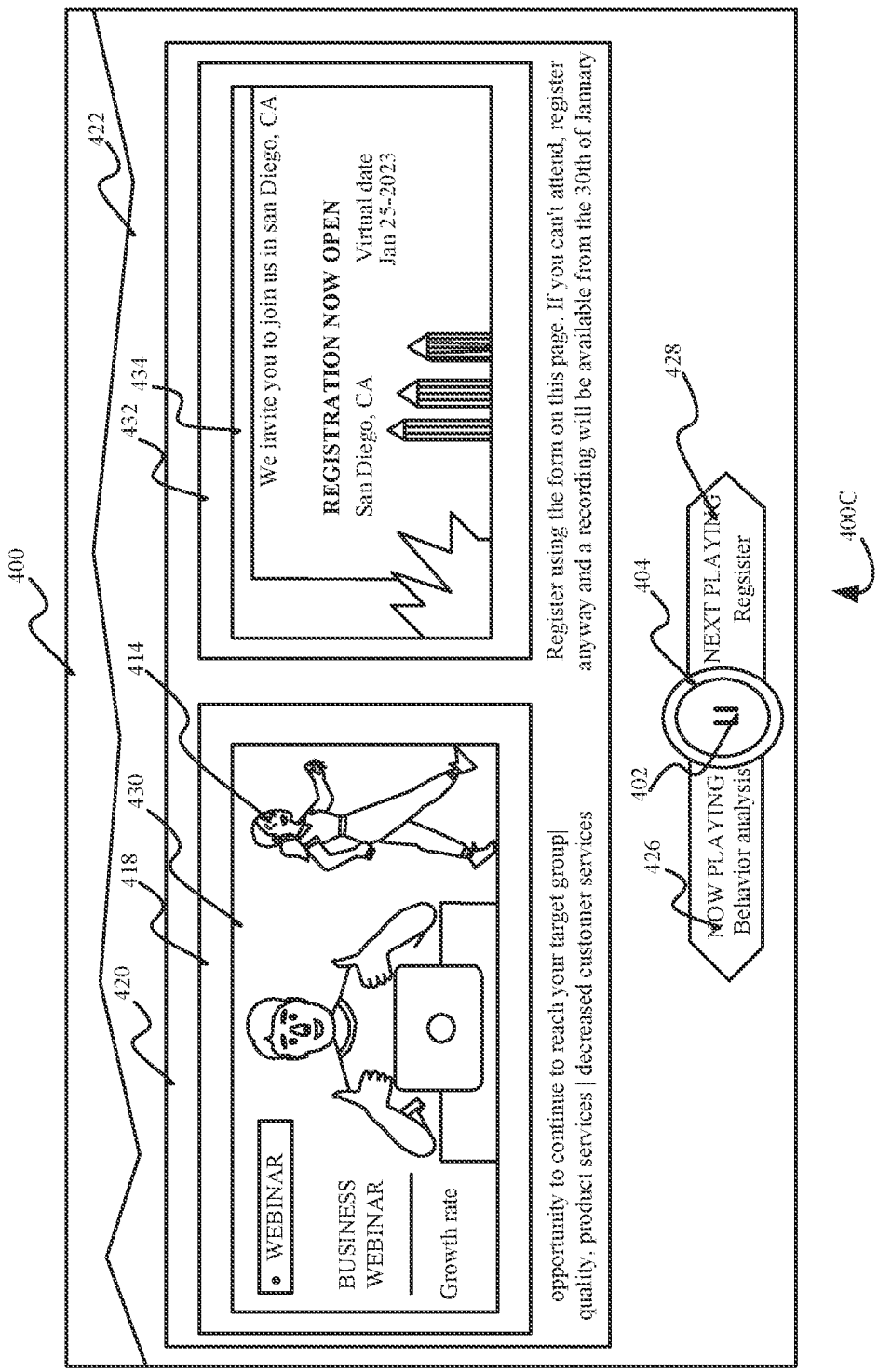
FIG. 4C is an exemplary user interface view that illustrates transitioning a narrator through video segments in the personalized hybrid webpage according to some embodiments herein.

FIG. 4C is an exemplary user interface view 400C that illustrates transitioning a narrator through video segments in the personalized hybrid webpage 400 according to some embodiments herein. The exemplary view 400C of a personalized hybrid webpage 400 depicts an embedded video 420 includes the first video segment associated with the first screen component 418 and a second video segment associated with a second screen component 432. The exemplary view of a personalized hybrid webpage 400 depicts a first thumbnail image 430 associated with the first screen component 418 and a second thumbnail image 434 associated with the second screen component 432.

The personalized hybrid webpage 400 depicts the first narrator video 414 which transitions from the first screen component 418 to the second screen component 432 as shown in FIG. 4C when the embedded video 420 navigates from the first video segment to the second video segment.

The personalized hybrid webpage 400 depicts an overall video segment indicator 422 positioned outside the first screen component 418, and the second screen component 432 or the embedded video 420. The personalized hybrid webpage 400 depicts the playback controller 402 associated with the video segment progress indicator 404 that are positioned outside the first screen component 418, the second screen component 432, and the embedded video 420.

Figure 4D:
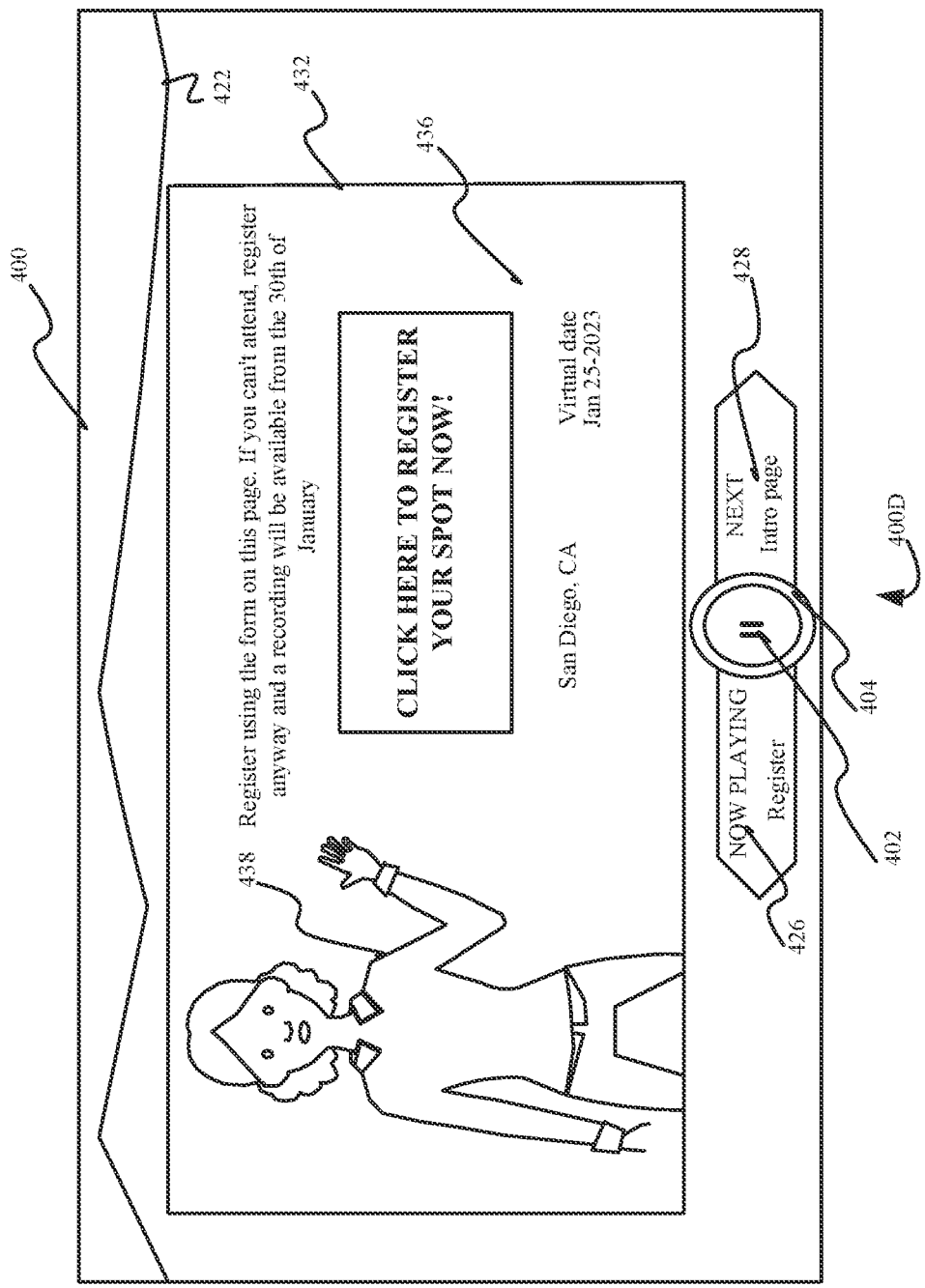
FIG. 4D is an exemplary user interface view that illustrates a call to action on the video segment in the personalized hybrid webpage according to some embodiments herein.

FIG. 4D is an exemplary user interface view 400D that illustrates a call-to-action in the personalized hybrid webpage 400 according to some embodiments herein. The personalized hybrid webpage 400 depicts the second screen component associated with the second video segment that includes a second background content 436, and a second narrator video 438. The second narrator video 438 narrates the second background content 436 in the second video segment when the first narrator video 414 navigates to the second screen component 432. The personalized hybrid webpage 400 displays the second narrator video 438 in the second screen component 432 when the first narrator video 414 transitions from the first screen component 418 to the second screen component 432 at the user device 104.

The personalized hybrid webpage 400 depicts transforming the second thumbnail image 434 into the second video segment by synchronizing the second narrator video 438 with the second background content 436 when the first narrator video 414 transitions from the first screen component 418 to the second screen component 432 at the user device 104.

The personalized hybrid webpage 400D depicts the second thumbnail image 434 of the second video segment transformed into the second video segment in the second screen component 432. The second screen component 432 displays the call-to-action element like "click here to register your spot now" at end of the second video segment to help the user 102 to register the webinar.

Figure 5A:
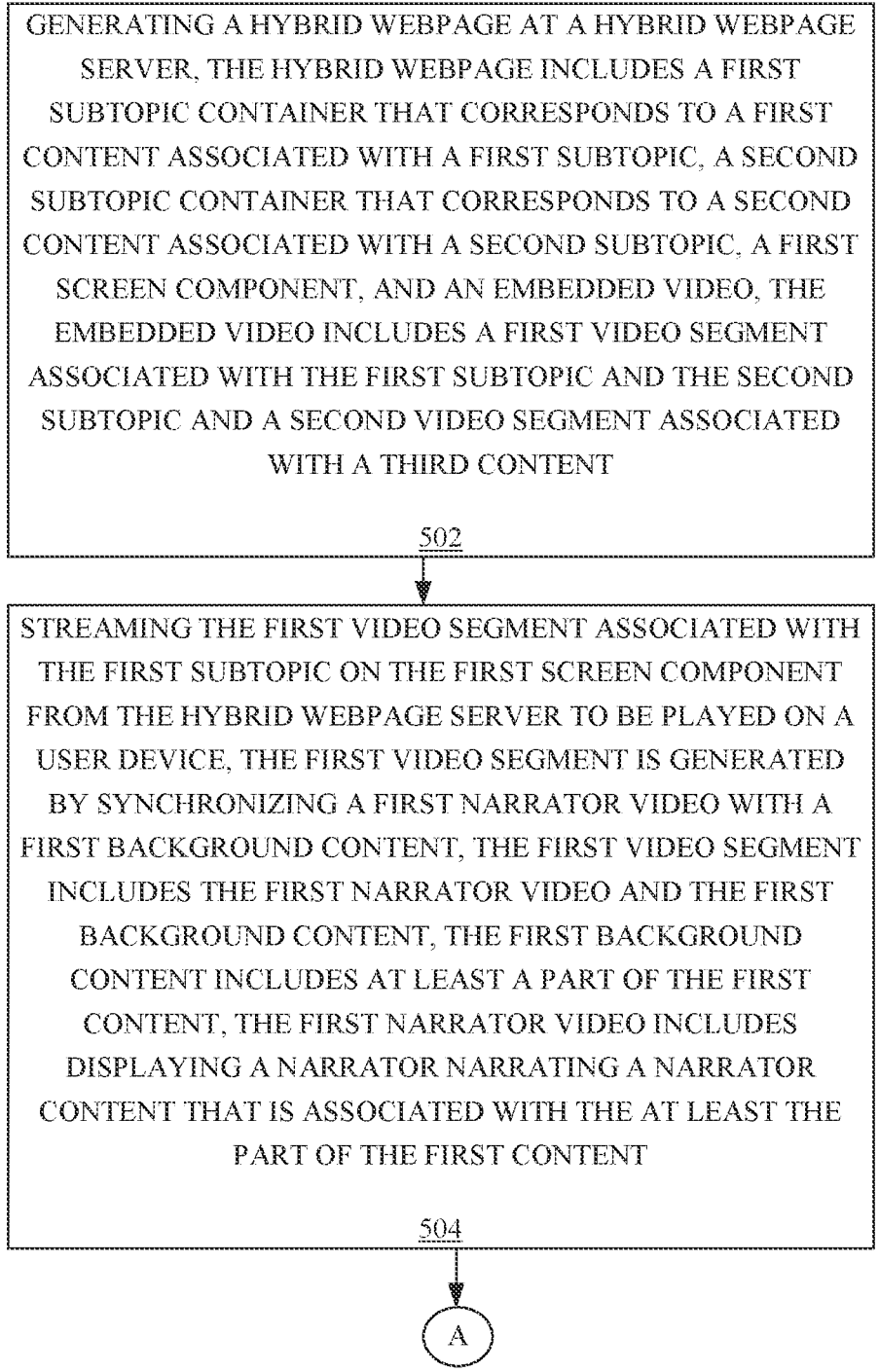
FIGS. 5A and 5B are flow diagram that illustrates a method for enabling navigation of a personalized hybrid webpage through video segments on a user device according to some embodiments herein.
Figure 5B:
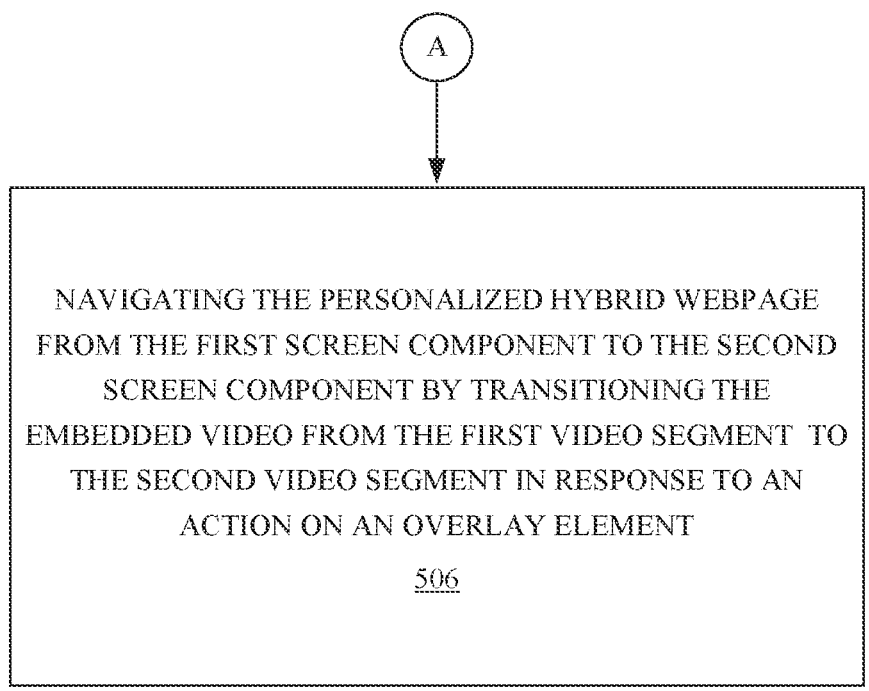

FIGS. 5A and 5B are flow diagram that illustrates a method for enabling navigation of a hybrid webpage through video segments on a user device according to some embodiments herein. At step 502, a method includes generating the personalized hybrid webpage at a hybrid webpage server, the personalized hybrid webpage includes a first subtopic container that corresponds to a first content associated with a first subtopic, a second subtopic container that corresponds to a second content associated with a second subtopic, a first screen component, and the embedded video, the embedded video includes a first video segment associated with the first subtopic and the second subtopic and a second video segment associated with the third content. At step 504, the method includes streaming the first video segment associated with the first content on the first screen component from the hybrid webpage server to be played on the user's device. The first video segment includes a first narrator video and a first background content, the first video segment is generated by synchronizing the first narrator video 318 with the first background content. At step 506, the method includes navigating the personalized hybrid webpage from the first screen component to a second screen component by transitioning the embedded video from the first video segment to the second video segment in response to an action on the overlay element.

In some embodiments, the method includes modifying at least one of a first position or a first size of the first narrator video dynamically relative to at least one of a second position or a second size of the first background content when the embedded video navigates from the first subtopic container that is selected from one or more subtopic containers that is played on the first screen component to the second subtopic container that is selected from the one or more subtopic containers that is played on the first screen component. The first video segment includes the one or more subtopic containers.

In some embodiments, the method includes displaying the narrator transitioning from the first screen component to a second component at the user device when the embedded video navigates from the first video segment that is selected from one or more video segments that is played on the first screen component to the second video segment that is selected from the one or more video segments that is played on the second screen component. The personalized hybrid webpage includes the second screen component.

In some embodiments, the method includes displaying an overall video progress indicator at the user device that indicates an extent to which the embedded video has traversed. The overall video progress indicator is positioned outside of the first screen component, the second screen component, and the embedded video.

In some embodiments, the method includes displaying a playback controller that includes a video segment progress indicator and the overlay element at the user device. The video segment progress indicator indicates a progression of a video segment that is selected from the one or more video segments of the embedded video. The video segment progress indicator is positioned outside of one or more screen components. The personalized hybrid webpage includes the one or more screen components.

In some embodiments, the method includes enabling navigation of the personalized hybrid webpage by dynamically modifying at least one of (i) a third position relative to other visual components of the personalized hybrid webpage, or (ii) an appearance of the playback controller at the user device corresponding to a change in a state of playing of the embedded video. The state of playing is selected from any of (a) during playing, or (b) after playing. The personalized hybrid webpage has one or more visual components displayed on the user's device.

In some embodiments, the method includes transforming a second thumbnail image into the second video segment when the first narrator video is displayed as transitioning from the first screen component to the second screen component. The second screen component includes the second thumbnail image.

In some embodiments, the method includes automatically mapping a text or an image of one or more background content associated the narrator content of a narrator video to identify one or more timestamps for the plurality of video segments. The narrator video includes one or more narrator videos.

In some embodiments, the method includes automatically identifying the first video segment by synchronizing the first narrator video with the first background content based on a timestamp from the one or more timestamps. The one or more narrator videos include the first narrator video and a second narrator video.

In some embodiments, the method includes automatically personalizing the narrator content of the narrator video based on at least one of a name of a user associated with the user device, or a name of a company associated with the user. The narrator video includes one or more narrator videos.

Figure 6:
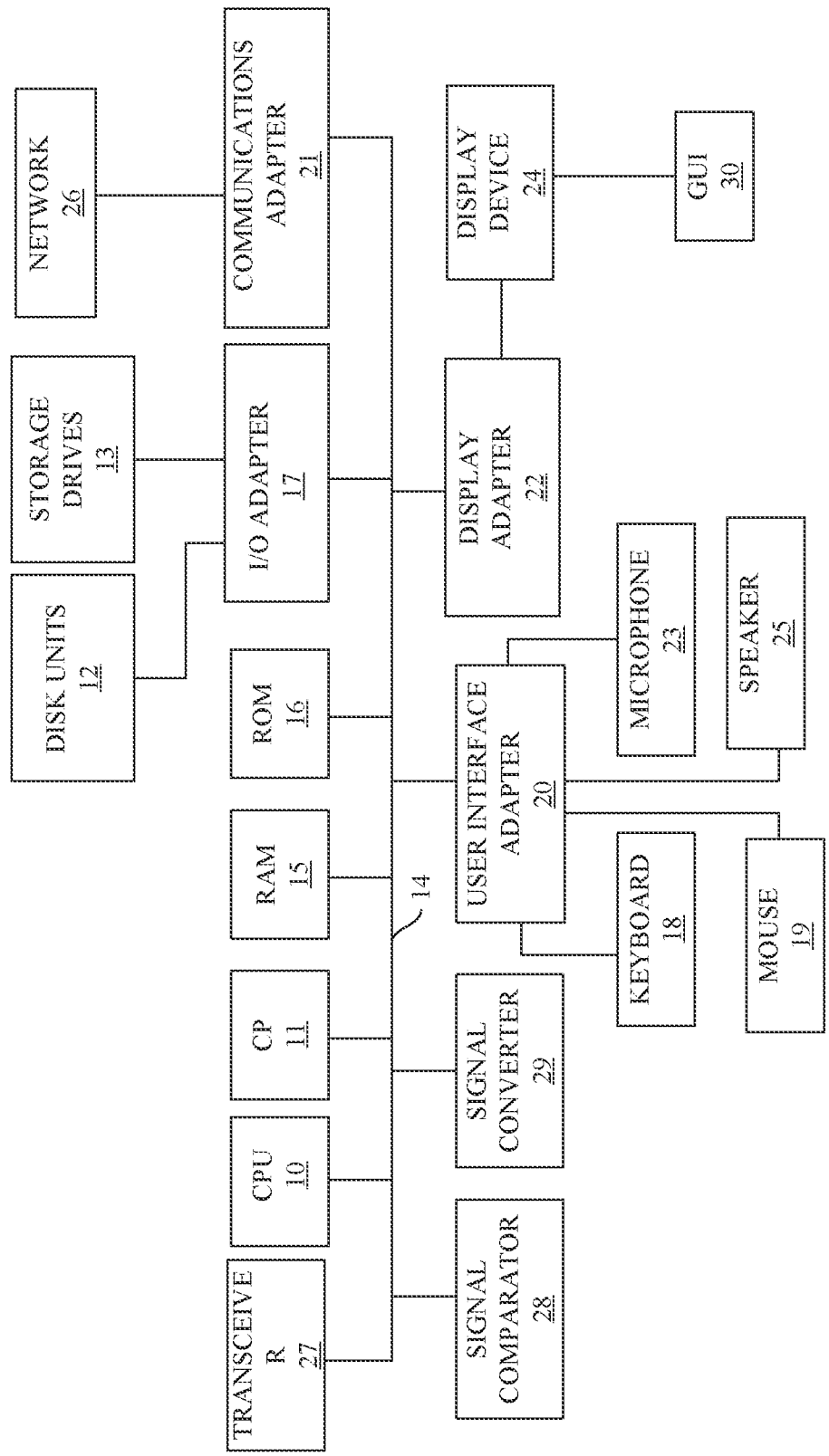
FIG. 6 is a schematic diagram of a computer architecture in accordance with the embodiments herein.

A representative hardware environment for practicing the embodiments herein is depicted in FIG. 6, with reference to FIGS. 1 through 2. This schematic drawing illustrates a hardware configuration of hybrid webpage server/computer system/computing device in accordance with the embodiments herein. The system includes at least one processing device CPU 10 that may be interconnected via system bus 12 to various devices such as a random-access memory (RAM) 14, read-only memory (ROM) 16, and an input/output (I/O) adapter 18. The I/O adapter 18 can connect to peripheral devices, such as disk units 38 and program storage devices 13 that are readable by the system. The system can read the inventive instructions on the program storage devices 13 and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 42, and a display adapter 21 connects the bus 12 to a display device 23, which provides a graphical user interface (GUI) 29 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for enabling a navigation of a personalized hybrid webpage that is rendered on a user device, the method comprising:

generating the personalized hybrid webpage at a hybrid webpage server, wherein the personalized hybrid webpage comprises a first subtopic container that corresponds to a first content associated with a first subtopic, a second subtopic container that corresponds to a second content associated with a second subtopic, a first screen component, a second screen component, and an embedded video, wherein the embedded video comprises a first video segment associated with the first subtopic and the second subtopic and a second video segment associated with a third content;

streaming the first video segment associated with the first subtopic on the first screen component, from the hybrid webpage server to be played on the user device, by synchronizing a first narrator video with a first background content, wherein the first video segment comprises the first narrator video and the first background content, wherein the first background content comprises at least a part of the first content, wherein the first narrator video comprises displaying a narrator narrating a narrator content that is associated with the at least the part of the first content; and navigating the personalized hybrid webpage by transitioning the first narrator video from the first screen component to the second screen component, at the user device, in response to an action on an overlay element when the embedded video navigates from the first video segment to display the second video segment, or automatically transitioning the first narrator video from the first screen component to display a second narrator video in the second screen component in a sequential order, wherein the overlay element comprises (i) a playback controller, (ii) a video segment progress indicator, (iii) a label of now playing, and (iv) a label of next playing, wherein the personalized hybrid webpage displays an overall video progress indicator, at the user device, that indicates an extent to which the embedded video has traversed, wherein the video segment progress indicator indicates a progression of a video segment that is selected from the plurality of video segments of the embedded video, wherein the overall video progress indicator is positioned outside of a plurality of screen components and the overlay element, wherein the personalized hybrid webpage comprises the plurality of screen components.

2. The processor-implemented method of claim 1, wherein the method further comprises modifying at least one of a first position or a first size of the first narrator video dynamically relative to at least one of a second position or a second size of the first background content when the embedded video navigates from the first subtopic container that is selected from a plurality of subtopic containers that is played on the first screen component to the second subtopic container that is selected from the plurality of subtopic containers that is played on the first screen component, wherein the first video segment is associated with the plurality of subtopic containers.

3. The processor-implemented method of claim 1, further comprising, displaying the first narrator video on the first screen component when the first narrator video transitions from the first subtopic container associated with the first content to the second subtopic container associated with the second content at the user device.

4. The processor-implemented method of claim 1, wherein the method for enabling the navigation of the personalized hybrid webpage further comprises dynamically modifying at least one of (i) a third position relative to other visual components of the personalized hybrid webpage, or (ii) an appearance of the playback controller, at the user device, corresponding to a change in a state of playing of the embedded video, wherein the state of playing is selected from any of (a) during playing, and (b) after playing, wherein the personalized hybrid webpage comprises a plurality of visual components that are displayed at the user device.

5. The processor-implemented method of claim 1, wherein the method further comprises transforming a first thumbnail image of the first video segment into the first video segment when the first narrator video is synchronized with the first background content in the first screen component at the user device, wherein the first screen component comprises the first thumbnail image of the first video segment.

6. The processor-implemented method of claim 1, wherein the method further comprises automatically mapping a text or an image associated with a plurality of background contents with a narrator content of a narrator video to identify at least one timestamp for the plurality of video segments, wherein the narrator video comprises a plurality of narrator videos.

7. The processor-implemented method of claim 1, wherein the method further comprises automatically identifying the first video segment by synchronizing the first narrator video with the first background content from a plurality of narrator videos and a plurality of background content based on the at least one timestamp, wherein the plurality of narrator videos comprises the first narrator video and the second narrator video.

8. A system for enabling a navigation of a personalized hybrid webpage that is rendered on a user device, the system comprising:
a memory that stores a set of instructions;
a processor that is configured to execute the set of instructions and is configured to
generate the personalized hybrid webpage at a hybrid webpage server, wherein the personalized hybrid webpage comprises a first subtopic container that corresponds to a first content associated with a first subtopic, a second subtopic container that corresponds to a second content associated with a second subtopic, a first screen component, a second screen component, and an embedded video, wherein the embedded video comprises a first video segment associated with the first subtopic and the second subtopic and a second video segment associated with a third content;
stream the first video segment associated with the first subtopic on the first screen component, from the hybrid webpage server to be played on the user device, by synchronizing a first narrator video with a first background content, wherein the first video segment comprises the first narrator video and the first background content, wherein the first background content comprises at least a part of the first content, wherein the first narrator video comprises displaying a narrator narrating a narrator content that is associated with the at least the part of the first content; and
navigate the personalized hybrid webpage by transitioning the first narrator video from the first screen component to the second screen component, at the user device, in response to an action on an overlay element when the embedded video navigates from the first video segment to display the second video segment, or automatically transitioning the first narrator video from the first screen component to display a second narrator video in the second screen component in a sequential order, wherein the overlay element comprises (i) a playback controller, (ii) a video segment progress indicator, (iii) a label of now playing, and (iv) a label of next playing, wherein the personalized hybrid webpage displays an overall video progress indicator, at the user device, that indicates an extent to which the embedded video has traversed, wherein the video segment progress indicator indicates a progression of a video segment that is selected from the plurality of video segments of the embedded video, wherein the overall video progress indicator is positioned outside of a plurality of screen components and the overlay element, wherein the personalized hybrid webpage comprises the plurality of screen components.

9. The system of claim 8, wherein the processor is further configured to modify at least one of a first position or a first size of the first narrator video dynamically relative to at least one of a second position or a second size of the first background content when the embedded video navigates from the first subtopic container that is selected from a plurality of subtopic containers that is played on the first screen component to the second subtopic container that is selected from the plurality subtopic containers of that is played on the first screen component, wherein the first video segment is associated with the plurality of subtopic containers.

10. The system of claim 8, the processor is further configured to display the first narrator video on the first screen component when the first narrator video transitions from the first subtopic container associated with the first content to the second subtopic container associated with the second content at the user device.

11. The system of claim 8, wherein the processor is further configured to enable the navigation of the personalized hybrid webpage by dynamically modifying at least one of (i) a third position relative to other visual components of the personalized hybrid webpage, or (ii) an appearance of the playback controller, at the user device, corresponding to a change in a state of playing of the embedded video, wherein the state of playing is selected from any of (a) during playing, or (b) after playing, wherein the personalized hybrid webpage comprises a plurality of visual components displayed at the user device.

12. The system of claim 8, wherein the processor is further configured to transform a first thumbnail image of the first video segment into the first video segment when the first narrator video is synchronized with the first background content in the first screen component at the user device, wherein the first screen component comprises the first thumbnail image of the first video segment.

13. The system of claim 8, wherein the processor is further configured to automatically map a text or an image associated with a plurality of background content with a narrator content of a narrator video to identify at least one timestamp for the plurality of video segments, wherein the narrator video comprises a plurality of narrator videos.

14. The system of claim 8, wherein the processor is further configured to automatically synchronize the first narrator video with the first background content from a plurality of narrator videos and a plurality of background content based on the at least one timestamp, wherein the plurality of narrator videos comprises the first narrator video and the second narrator video.

15. One or more non-transitory computer-readable storage mediums storing one or sequences of instructions, which when executed by one or more processors, causes a method for enabling navigation of a personalized hybrid webpage that is rendered on a user device, wherein the method comprises,
generating the personalized hybrid webpage at a hybrid webpage server, wherein the personalized hybrid webpage comprises a first subtopic container that corresponds to a first content associated with a first subtopic, a second subtopic container that corresponds to a second content associated with a second subtopic, a first screen component, a second screen component, and an embedded video, wherein the embedded video comprises a first video segment associated with the first subtopic and the second subtopic and a second video segment associated with a third content;
streaming the first video segment associated with the first subtopic on the first screen component, from the hybrid webpage server to be played on the user device, by synchronizing a first narrator video with a first background content, wherein the first video segment comprises the first narrator video and the first background content, wherein the first background content comprises at least a part of the first content, wherein the first narrator video comprises displaying a narrator narrating a narrator content that is associated with the at least the part of the first content; and navigating the personalized hybrid webpage by transitioning the first narrator video from the first screen component to the second screen component, at the user device, in response to an action on an overlay element when the embedded video navigates from the first video segment to display the second video segment, or automatically transitioning the first narrator video from the first screen component to display a second narrator video in the second screen component in a sequential order, wherein the overlay element comprises (i) a playback controller, (ii) a video segment progress indicator, (iii) a label of now playing, and (iv) a label of next playing, wherein the personalized hybrid webpage displays an overall video progress indicator, at the user device, that indicates an extent to which the embedded video has traversed, wherein the video segment progress indicator indicates a progression of a video segment that is selected from the plurality of video segments of the embedded video, wherein the overall video progress indicator is positioned outside of a plurality of screen components and the overlay element, wherein the personalized hybrid webpage comprises the plurality of screen components.

\* \* \* \* \*